H. B. & R. M. ROSS.
MECHANISM FOR TRANSMITTING MOTION.
APPLICATION FILED JAN. 26, 1910.
989,426.
Patented Apr. 11, 1911.
3 SHEETS—SHEET 1.
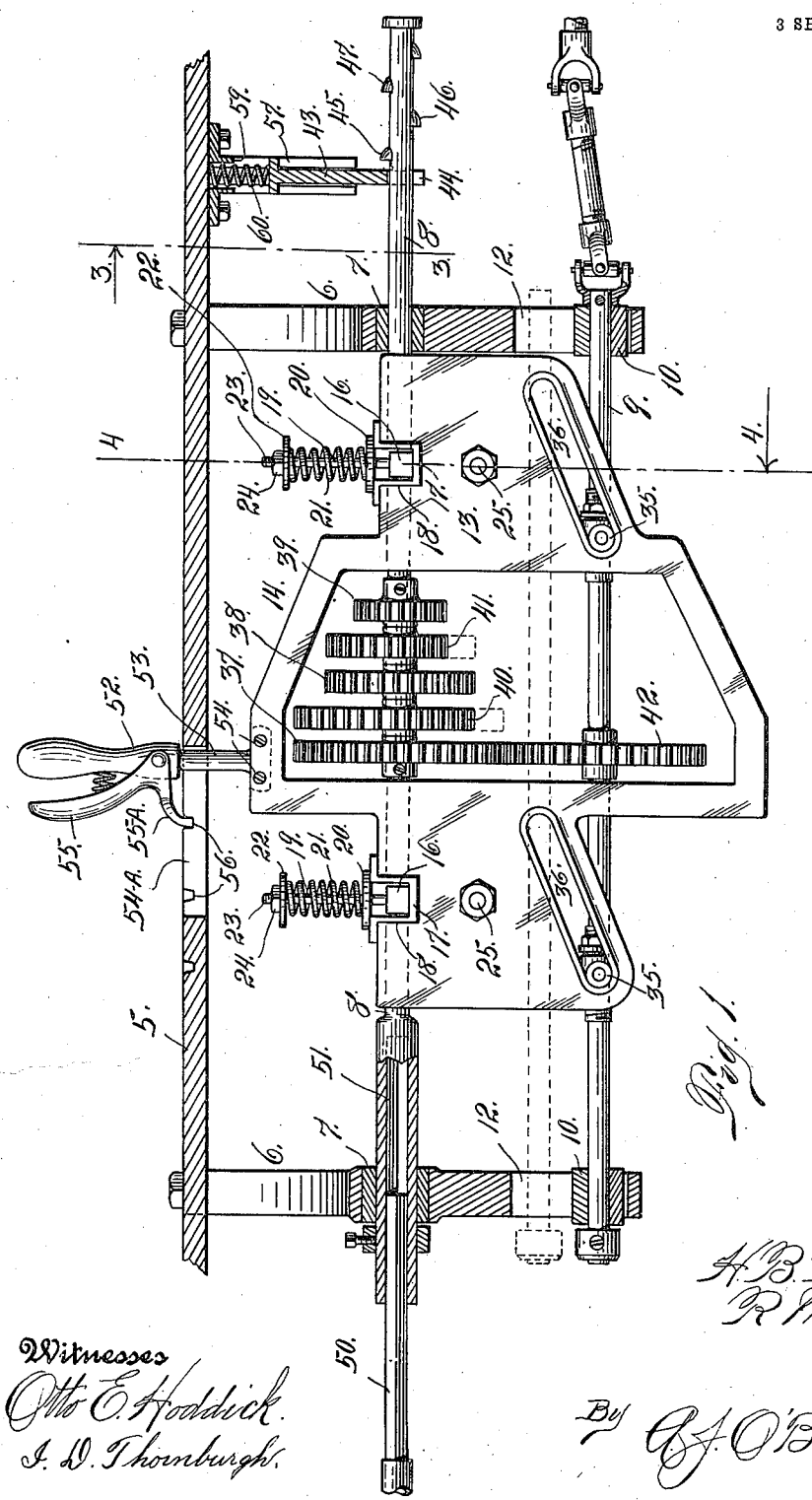

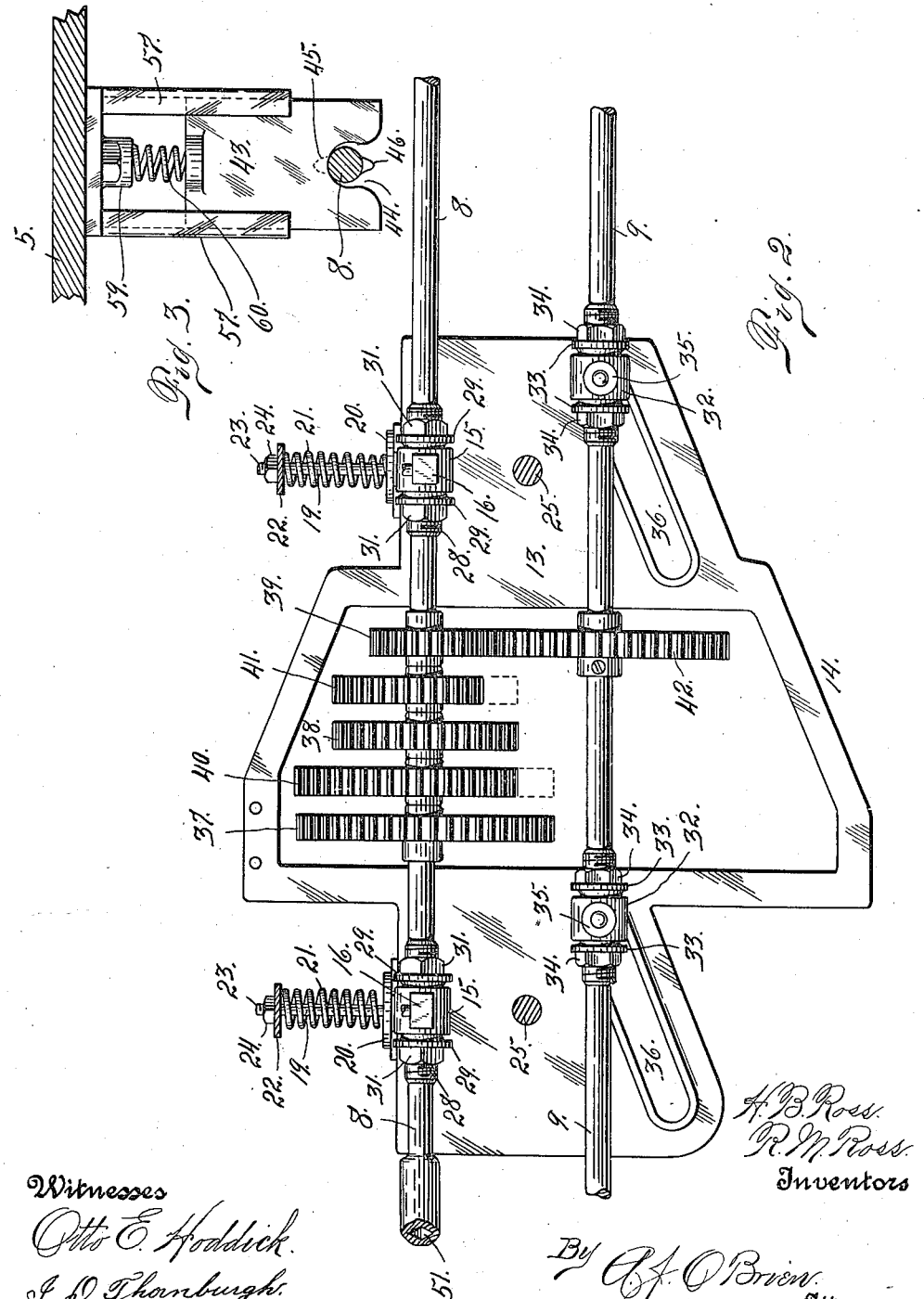

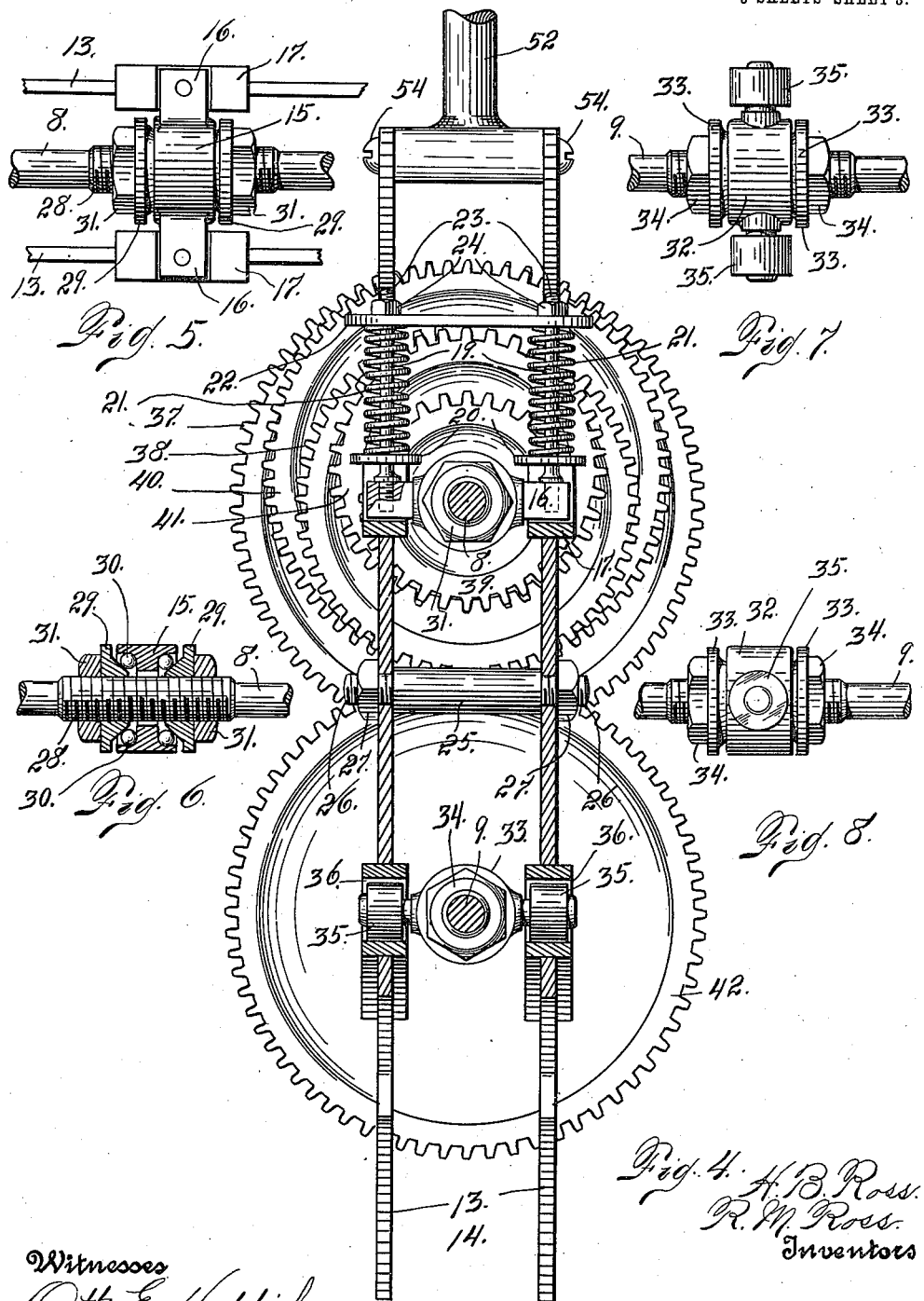

UNITED STATES PATENT OFFICE.

HARRY BEAUREGARD ROSS AND ROBERT M. ROSS, OF DENVER, COLORADO, ASSIGNORS OF ONE-HALF TO H. BYRD NORTHROP, OF DENVER, COLORADO.

MECHANISM FOR TRANSMITTING MOTION.

989,426.  Specification of Letters Patent.  Patented Apr. 11, 1911.

Application filed January 26, 1910. Serial No. 540,246.

*To all whom it may concern:*

Be it known that we, HARRY BEAUREGARD Ross and ROBERT M. Ross, citizens of the United States, residing in the city and county of Denver and State of Colorado, have invented certain new and useful Improvements in Mechanism for Transmitting Motion; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in mechanism for transmitting motion, and is more especially adapted for use on automobiles or self-propelled vehicles, its object being to change the speed of the vehicle at will and without subjecting the transmission mechanism or other parts of the vehicle to injury by concussion or jar incident to the variation in speed from high to low or low to high.

In our improved construction the driving shaft is connected with a shaft longitudinally movable in a stationary framework, an auxiliary frame being mounted on the driving shaft and movable longitudinally therewith, the shaft, however, being free to rotate in the auxiliary framework. Upon the driving shaft is mounted a number of gears of different diameter which rotate with the driving shaft. Interposed between these gears are other gears eccentrically mounted and which serve to cause the driving gears to change their intermeshing relation with the gear on the driven shaft without shock or jar to the mechanism, since the eccentric gear located between any two concentric gears of different diameter, has its point of maximum eccentricity a distance from the axis of the shaft equal to the radius of the driving gear having the greater diameter, so that as the shaft carrying the driving gears is shifted the driven gear is first brought into mesh with the eccentric gear at its maximum point of eccentricity, and as the driven gear moves upwardly or downwardly to mesh with the driving gear of greater or less diameter, it follows the eccentric gear until it reaches the same level as the periphery of the gear which it is about to engage and consequently moves into mesh therewith without shock or jar. From this it will be understood that as the driving shaft and its auxiliary framework are shifted, provision must be made for causing the driven shaft to move upwardly or downwardly with relation to the driving shaft, and for a sufficient range of movement to allow the gear of the driven shaft to move successively into mesh with all of the concentric gears of the driving shaft. To this end the driven shaft, which occupies an intermediate position between two parallel members of which the auxiliary framework is composed, is journaled in cross-heads whose extremities are equipped with antifrictional bearings, as rollers, adapted to travel in suitably inclined bearing-slots formed in the two members of the auxiliary frame, the inclination of the bearing slots being made to harmonize with the change of radius of the driving gears.

Having briefly outlined our improved construction we will proceed to describe the same in detail, reference being made to the accompanying drawings in which is illustrated an embodiment thereof.

In these drawings: Figure 1 is a sectional view of the stationary framework of our improved transmission mechanism, the latter for the most part being shown in side elevation. Fig. 2 is a detail view of the transmission mechanism, showing however but one side of its framework, the other side being removed, the stationary framework being omitted. Fig. 3 is a section taken on the line 3—3, Fig. 1, looking toward the right, the parts being shown on a larger scale. Fig. 4 is a vertical section taken on the line 4—4, Fig. 1, looking toward the left, the parts being shown on a larger scale. Fig. 5 is a top plan view illustrating one of the cross-head bearings of the driving shaft. Fig. 6 is a sectional view taken through the ball bearing construction of either the driving or driven shaft. Fig. 7 is a top plan view of the driven shaft together with one of its cross-head bearings equipped at its extremities with antifrictional rollers. Fig. 8 is a side elevation of the same.

The same reference characters indicate the same parts in all the views.

Let the numeral 5 designate a relatively stationary platform, as the body of a vehicle having depending hangers 6 carrying centrally located bearings 7 adapted to receive a driving shaft 8, which is both slidably and rotatably mounted in the said bearings. Located directly below the driving shaft 8 is a driven shaft 9 slidably and rotatably mounted in bearings 10 which are vertically movable in the lower portions of the hangers 6 which are slotted as shown at 12 for the purpose. These two shafts are interposed centrally between the two members 13 of an auxiliary framework 14, the two members being spaced as best illustrated in Fig. 4. The driving shaft is also journaled in cross-head bearings 15 whose extremities are rectangular in shape as shown at 16 and fit into stirrup-shaped members 17 mounted in recesses 18 formed in the edges of the two frame members 13. Each extremity 16 of each bearing 15 is equipped with an upwardly projecting stem 19 which passes through a washer 20 closing the stirrup-shaped member at the top. Surrounding each stem 19 is a spiral spring 21 whose upper extremity engages one end of a cross plate 22 through which the stem passes, the upper extremity of the latter being threaded as shown at 23 to receive a tension nut 24. The cross plate 22 connects the two stems 19 connected with the extremities 16 of each cross head bearing 15. As shown in the drawing, there are two of these bearings 15, each being precisely of the construction just explained.

The two frame members 13 are connected by bolts 25 having reduced threaded extremities 26 which pass through openings formed in the members 13, nuts 27 being applied to the protruding threaded extremities of the said bolts. The portion of each bolt interposed between the two frame members 13 is larger than the threaded extremities, whereby shoulders are formed which are engaged by the inner surfaces of the two members, thus accurately spacing the latter.

The driving shaft where it engages each cross-head bearing, is enlarged or reinforced and threaded as shown at 28 and cones 29 are threaded thereon to engage ball bearings 30 located in runways formed in the main bearing member 15. These cones are engaged by lock nuts 31.

The driven shaft 9 is journaled in similar bearings 32 having cones 33 engaged by lock nuts 34. The extremities of each bearing 32 are equipped with rollers 35 which engage inclined slots 36 formed in the parallel frame members 13. As there are two cross-head bearings 32 for the driven shaft there are two pairs of inclined slots 36 formed in the framework 14 of the transmission mechanism.

Mounted on the driving shaft 8 is a number of concentric gears 37, 38 and 39, the said gears being fast on the shaft and adapted to rotate therewith. Also mounted on the same shaft and interposed between the concentric gears are two eccentric gears 40 and 41. The eccentric gears 40 and 41 are so constructed that their maximum radii are equal, respectively, to the radii of the larger adjacent concentric gears. That is to say, the point of maximum eccentricity of the eccentric gear 40 is removed from the axis of the driving shaft a distance equal to the radius of the gear 37; while the maximum point of eccentricity of the eccentric gear 41 is removed from the axis of the driving shaft a distance equal to the radius of the concentric gear 38. Furthermore the point of minimum eccentricity of the eccentric gear 40 or the minimum radius of the last named gear is equal to the radius of the smaller adjacent concentric gear 38; while the minimum radius of the eccentric gear 41 is equal to the radius of the smaller adjacent gear 39.

The driven shaft 9 is equipped with a concentric gear 42 of the same size as the largest gear, namely, that designated 37 of the driving shaft. Hence it follows that when the shaft 8 is rotated and the two gears 37 and 42 are in mesh, the driven shaft 9 is rotated at the same speed as the driving shaft 8.

Now if it is desired to change the relative speed of the two shafts, and cause the driven shaft to rotate at a less speed than the driving shaft, the latter, together with the auxiliary framework 14, will be shifted upon the stationary framework a sufficient distance to bring the gear 42 of the driven shaft into mesh with a smaller gear 38 of the driving shaft. Provision, however, is made whereby the shifting of the driving shaft, together with the auxiliary framework is prevented, until the point of maximum eccentricity of the eccentric gear 40 occupies the same plane or is tangential to the same plane as the periphery of the driven gear 42. In this event the last named gear will first mesh with the eccentric gear 40, and then as the auxiliary frame is moved with the driving shaft toward the left (see Fig. 1), the gear 42 will follow the eccentric gear upwardly as the radius of the eccentric gear diminishes at its point of contact with the gear 42, until the last named gear is in mesh with the gear 40 at its point of minimum eccentricity. In this event, the periphery of the gear 42 is in position to mesh with the concentric driving gear 38. Again, if it is desired to further diminish the speed of the driven shaft 9, the movement of the driving shaft 8, together with the auxiliary frame mounted thereon will continue until the driven gear 42 will mesh with the smallest concentric driving gear 39. But before the gear 42 meshes with the gear 39, it must first mesh with the eccentric gear 41, and this it will do when the point of maximum eccentricity of the gear 41 is in the same plane as the periphery of the gear 42, after which the gear 42 will move upwardly with the driven shaft 9 until the point of minimum eccentricity on the gear 41 is reached when the gear 42 will slip readily into mesh with the smallest driven gear 39.

In order to regulate the movement of the driven shaft 8 toward the left for the purpose of changing the relative speed of the driving and driven shafts, a stop plate 43 is employed, the said plate having a recess 44 in its lower extremity through which the driving shaft 8 passes. Where the driving and driven shafts 8 and 9 are located in the same vertical plane with the driving shaft uppermost, the driving shaft must be locked against movement toward the left until the point of maximum eccentricity of the eccentric gear 40 is in the same plane as the uppermost point on the periphery of the driven shaft 42; and in order to so regulate the movement of the shaft 8, the latter is equipped with a lug 45 which occupies a position on the shaft 9 corresponding with the inner extremity of the maximum radius of the eccentric gear 40. Hence, when the lug 45 is at its highest point on the rotating shaft 8, it is in position to stop the movement of the shaft 8 toward the left far enough to disengage the gear 37 from the gear 42, until the point of maximum eccentricity of the gear 40 has reached its lowest point. In this event the lug 45 would also have reached its lowest point on the shaft 8 and the said shaft will then be free to move toward the left since the lug will pass through the recess 44 of the stop plate 43, and this movement of the shaft may be continued until the gear 42 is thrown into mesh with the gear 38. In this event a lug 46 will be uppermost on the shaft 8 and will limit the further travel of the shaft toward the left, thus notifying the operator that the shaft 8 has been shifted sufficiently to bring the concentric gear 38 into mesh with the driven gear 42, in which event the operator will cease to move the shaft 8 in the said direction. However, if he wishes to again change the relative speed of the driven shaft, he will shift the driving shaft 8 again toward the left and in this event the stop 46 will prevent the travel of the shaft 8 toward the left sufficiently to throw the gear 38 out of mesh with the gear 42 until the point of maximum eccentricity of the gear 41 has reached its lowest point, in which event the lug 46 will be in position to pass through the recess of the stop plate 43 with the driving shaft 8. In this event the driven gear 42 will first mesh with the eccentric gear 41 at the point of maximum eccentricity of the latter and will maintain its mesh with the said eccentric gear until the point of minimum eccentricity of the latter is reached, when the gear 42 will slip into mesh with the smallest concentric gear 39 of the driving shaft; and the further movement toward the left of the shaft 8 will be checked by a stop lug 47.

After the driving shaft has been shifted toward the left to its limit of movement, whereby the speed of the driven shaft has been gradually reduced as compared with that of the driving shaft, the operation may be reversed by moving the driving shaft toward the right and thus successively bringing the driving concentric gears 38 and 37 into engagement with the driven gear 42, thus gradually increasing the speed of the driven shaft as compared with that of the driving shaft. During this operation the intermediately located eccentric gears perform the same function as heretofore explained when diminishing the relative speed of the driven shaft as compared with that of the driving member. However, attention is called to the fact that in moving the driving shaft from left to right or from the position shown in Fig. 2 to the position shown in Fig. 1, the stop lugs are not necessary, since the eccentric gear 41 will act as its own stop by engagement with the gear 42 to prevent the intermeshing of the gears 41 and 42 until the point of minimum eccentricity of the gear 41 is lowermost and when this occurs the gear 42 will slip into mesh with the eccentric gear 41 and will travel downwardly with the latter as its radius increases at the point of contact with the gear 42 until the uppermost point of the latter is in position to slip into mesh with the concentric gear 38. Again, if it is desired to continue the movement of the driving shaft 8 toward the right, the eccentric shaft 40 will act as a stop against the further movement of the shaft 8 toward the right, until the point of minimum eccentricity of the gear 40 is lowermost, when the said gear will slip into mesh with the gear 42 and remain in mesh therewith until the maximum point of eccentricity is reached, when the periphery of the gear 37 is in position to mesh with the gear 42. In further explanation of the operation of the mechanism, it may be stated, that as the driving shaft 8 is moved back and forth with the auxiliary frame 14, the driving shaft does not change its position vertically but the driven shaft is raised and lowered by virtue of the movement of the auxiliary frame having the inclined bearing slots which are engaged by the extremities of the cross-head bearings of the driven shaft; and as the extremities of these bearings must follow the inclined slots of the frame members 13, the driven shaft moves upwardly and downwardly to harmonize with the change of radius of the various driving gears mounted on the driving shaft.

In order to permit the driving shaft to move longitudinally and still maintain its connection with the engine shaft 50, the latter, which is formed angular in cross section, is arranged to slide freely in a hollow portion 51 of the shaft 8, the opening of this hollow portion being shaped to fit the angular portion 50 of the engine shaft. The range of movement without destroying the connection between the engine shaft and the shaft 8 must, of course, be sufficient for the purpose (see Fig. 1).

In order to allow the operator to shift the shaft 8 and the auxiliary frame 14 mounted thereon, the upper portion of the auxiliary frame is equipped with a handle 52 having a stem 53 passing through a slot 54ᴬ, formed in the platform 5, the lower extremity of the stem 53 being secured to the members 13 of the auxiliary frame, as shown at 54. This handle 52 is therefore rigidly connected with the frame 14 and the slot 54ᴬ is of sufficient length to allow the auxiliary frame and the driving shaft the necessary range of movement.

The handle 52 is equipped with a spring-actuated pawl 55 having a member 55ᴬ adapted to engage locking notches or recesses 56 formed in the platform 5, at intervals corresponding with the space between the various pairs of concentric gears with which the driving shaft is equipped, thus making it practicable to lock the driving shaft and the frame 14 in the desired position of adjustment for speed-regulating purposes.

The stop plate 43 is vertically slidable in guides 57 secured to the lower side of the platform 5. Between the upper edge of the plate 43 and a depending stop 59 is located a coiled spring 60, which is under tension to maintain the stop plate 43 in engagement with the driving shaft. However, this stop plate is capable of upward movement against its spring 60, in case this movement should prove necessary. This contingency might arise if one of the lugs 45, 46 or 47 should turn into engagement with the recessed edge of the stop plate 43 while traveling through this recess.

By virtue of the springs 21, the stems 19 on which they are mounted and the parts associated therewith, the auxiliary frame 14 is yieldingly supported upon the shaft 8, to allow the said frame a certain degree of vertical movement independently of its longitudinal or endwise movement with the shaft 8. By virtue of this fact the parts work easily and smoothly and the vertical movement of the shaft 9 is not absolutely dependable upon the travel of its bearings in the slots 36 of the auxiliary frame.

Attention is called to the fact that any eccentric gear interposed between two concentric gears, as heretofore explained, must be so arranged that the cog located at its maximum point of eccentricity shall be directly in line with a cog of the larger adjacent concentric gear, while the cog of the same eccentric gear located at its point of minimum eccentricity shall be directly in line with a cog of the smaller adjacent concentric gear. This is necessary in order that the coöperating concentric gear 42 may always occupy such a position with reference to the eccentric gears that the latter will slide freely into mesh with the former during the endwise adjustment of the driving shaft. It may also be stated that by virtue of the relatively narrow spacing between the concentric and the eccentric gears of the shaft 8, the gear 42 of the driven shaft is not out of mesh with the concentric gear before it engages the eccentric gear, thus making a continuous mesh sliding, changeable-speed-gear construction. In other words, the width of the periphery of the driven gear 42 is sufficient to span the space between the gears on the driving shaft and partly engage an eccentric gear before it has entirely disengaged the adjacent concentric gear.

Having fully described our invention, what we claim is:

1. In means for transmitting motion, the combination with a driving and a driven shaft, the driving shaft being endwise movable, and the driven shaft being movable toward and away from the driving shaft, of a changeable-speed-gearing connection between the two shafts, comprising concentric gears of varying size, and eccentric gears interposed between the concentric gears, for the purpose set forth.

2. In means for transmitting motion, the combination with a driving and a driven shaft, the driving shaft being endwise movable and the driven shaft being movable toward and away from the driving shaft, of a changeable-speed-gearing connection between the two shafts, comprising concentric gears of varying size and eccentric gears interposed between the concentric gears, the maximum radius of any eccentric gear being equal to the radius of the larger adjacent concentric gear, and the minimum radius of the said eccentric gear being equal to the radius of the smaller concentric gear.

3. The combination with a driving shaft and a driven shaft, the driving shaft being endwise movable, and the driven shaft being movable toward and away from the driving shaft, of a changeable-speed-gearing connection between the two shafts, comprising a number of concentric gears mounted on the first shaft and eccentric gears coaxially mounted on the same shaft and interposed between the concentric gears, the said gears being all connected to rotate with the shaft, a coöperating gear mounted on the second shaft, and means for adjusting the gears for speed-changing purposes, whereby the gear on the second shaft in passing from one concentric gear to another on the first shaft encounters an eccentric gear, for the purpose set forth.

4. In mechanism of the class described, the combination with two shafts, one of the shafts being endwise movable and the other movable toward and away from the endwise movable shaft, of a changeable-speed-gearing connection between the said shafts, comprising a series of concentric gears mounted on the first shaft and eccentric gears interposed between the concentric gears, the eccentric gear interposed between any two concentric gears having a maximum radius equal to the radius of the larger concentric gear and a minimum radius equal to the radius of the smaller concentric gear, and a concentric gear mounted on the second shaft and arranged to successively engage the concentric gears of the first shaft and also the eccentric gears, for the purpose set forth.

5. The combination with two shafts having the relation to each other of driving and driven members, one of the shafts being endwise movable and the other movable toward and away from the endwise movable shaft, a number of concentric gears of varying diameter mounted on the endwise movable shaft, eccentric gears interposed between the concentric gears of the last named shaft, and a concentric gear mounted on the second shaft and adapted to successively engage the gears both concentric and eccentric of the endwise movable shaft, for the purpose set forth.

6. The combination with a relatively stationary frame, of a driving shaft movable endwise in the said frame, an auxiliary frame mounted on the said shaft to travel therewith, a driven shaft having bearings engaging inclined slots of the auxiliary frame, whereby as the latter is moved with the endwise movable shaft the driven shaft is moved toward and away from the driving shaft, and a changeable-speed-gearing connection between the two shafts, comprising a number of concentric gears mounted on the driving shaft, interposed eccentric gears mounted on the same shaft, and a coöperating concentric gear mounted on the driven shaft, substantially as described.

7. The combination with a relatively stationary frame, of a driving shaft movable endwise in said frame, an auxiliary frame yieldingly mounted on the said shaft and adapted to have endwise movement therewith, a driven shaft having bearings engaging inclined slots of the auxiliary frame, and a changeable-speed-gearing connection between the two shafts, comprising a number of concentric gears mounted on the driving shaft, interposed eccentric gears mounted on the same shaft, and a coöperating concentric gear mounted on the driven shaft.

8. In means for transmitting motion, the combination with two shafts, one of the said shafts being endwise movable, and the other movable toward and away from the endwise movable shaft, of a changeable-speed-gearing connection between the shafts, comprising concentric gears of varying size mounted upon the endwise movable shaft, eccentric gears interposed between the concentric gears, the maximum radius of any eccentric gear being equal to the radius of the larger concentric gear, and the minimum radius of the said eccentric gear being equal to the radius of the smaller concentric gear, the cog located at the point of maximum eccentricity of any eccentric gear being directly in line with a cog of the larger adjacent concentric gear, and the cog of any eccentric gear located at the point of minimum eccentricity of the same being directly in line with a cog of the smaller adjacent concentric gear, and a coöperating concentric gear mounted on the other shaft.

9. In means for transmitting motion, the combination with a driving shaft and a driven shaft, the driving shaft being endwise movable, and the driven shaft being movable toward and away from the endwise movable shaft, of a changeable-speed-gearing connection between the two shafts, comprising concentric gears of varying size and eccentric gears interposed between the concentric gears, all of the said gears being mounted on the driving shaft, and a coöperating concentric gear mounted on the driven shaft, the gears on the driving shaft being so spaced that the gear on the driven shaft may intermesh with any gear on the driving shaft before it is entirely disengaged from the adjacent gear thus forming a continuous mesh construction.

In testimony whereof we affix our signatures in presence of two witnesses.

HARRY BEAUREGARD ROSS.
ROBERT M. ROSS.

Witnesses:
A. J. O'BRIEN,
JESSIE F. HOBART.